United States Patent
Osawa et al.

(10) Patent No.: US 7,710,536 B2
(45) Date of Patent: May 4, 2010

(54) LIQUID CRYSTAL DIFFRACTION LENS ELEMENT AND OPTICAL HEAD DEVICE

(75) Inventors: Mitsuo Osawa, Koriyama (JP); Yoshiharu Ooi, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 240 days.

(21) Appl. No.: 11/737,177

(22) Filed: Apr. 19, 2007

(65) Prior Publication Data
US 2007/0182915 A1    Aug. 9, 2007

Related U.S. Application Data

(63) Continuation of application No. PCT/JP2005/019062, filed on Oct. 17, 2005.

(30) Foreign Application Priority Data
Oct. 19, 2004    (JP) ............... 2004-304249

(51) Int. Cl.
G02F 1/13    (2006.01)
G11B 7/135    (2006.01)
(52) U.S. Cl. ............ 349/202; 349/200; 349/201; 369/112.02; 369/112.24
(58) Field of Classification Search .......... 349/200–202
See application file for complete search history.

(56) References Cited

U.S. PATENT DOCUMENTS

| | | | | |
|---|---|---|---|---|
| 5,594,713 A | * | 1/1997 | Komma et al. | 369/44.23 |
| 6,014,197 A | * | 1/2000 | Hikmet | 349/201 |
| 6,618,116 B1 | * | 9/2003 | Murata et al. | 349/201 |
| 2004/0108984 A1 | | 6/2004 | Ogasawara | |
| 2005/0226122 A1 | | 10/2005 | Ooi et al. | |

(Continued)

FOREIGN PATENT DOCUMENTS

JP    62-170934 A    7/1987

(Continued)

OTHER PUBLICATIONS

U.S. Appl. No. 11/670,780, filed Feb. 2, 2007 Murata et al.

(Continued)

*Primary Examiner*—Andrew Schechter
(74) *Attorney, Agent, or Firm*—Oblon, Spivak, McClelland, Maier & Neustadt, L.L.P.

(57) ABSTRACT

A liquid crystal diffraction lens element and an optical head device, which can switch focal lengths of both of outgoing light and returning light by a single element, are provided.

The liquid crystal lens element comprises transparent substrates 1a, 1b, a liquid crystal 4 sandwiched between the transparent substrates 1a, 1b, transparent electrodes 2a, 2b, birefringent Fresnel lens members 3a, 3b each having a Fresnel lens shape and made of a birefringent material, and a seal 5, wherein the extraordinary refractive index direction A of the birefringent Fresnel lens member 3a and the extraordinary refractive index direction B of the birefringent Fresnel lens member 3b are perpendicular to each other, and the alignment direction of the liquid crystal 4 at the interface between the liquid crystal 4 and the transparent substrate 1a is perpendicular to the alignment direction of the liquid crystal 4 at the interface between the liquid crystal 4 and the transparent substrate 1b.

20 Claims, 4 Drawing Sheets

U.S. PATENT DOCUMENTS

| | | |
|---|---|---|
| 2006/0007385 A1 | 1/2006 | Murata et al. |
| 2006/0280100 A1 | 12/2006 | Ooi et al. |
| 2007/0109489 A1 | 5/2007 | Nomura et al. |
| 2007/0127348 A1 | 6/2007 | Ooi et al. |
| 2007/0146625 A1 | 6/2007 | Ooi et al. |
| 2007/0182915 A1 | 8/2007 | Osawa et al. |

FOREIGN PATENT DOCUMENTS

| | | |
|---|---|---|
| JP | 10-092003 A | 4/1998 |
| JP | 2002-357804 A | 12/2002 |
| JP | 2004-101885 A | 4/2004 |

OTHER PUBLICATIONS

U.S. Appl. No. 11/737,177, filed Apr. 19, 2007 Osawa et al.

U.S. Appl. No. 11/737,177, filed Apr. 19, 2007 Osawa et al.

* cited by examiner

LIQUID CRYSTAL DIFFRACTION LENS ELEMENT AND OPTICAL HEAD DEVICE

BACKGROUND OF THE INVENTION

1. Field of the Invention

The present invention relates to a liquid crystal diffraction lens element capable of switching a focal point, and to an optical head device employing the liquid crystal diffraction lens element for writing and/or reading (hereinafter referred to as writing/reading) an information to/from an optical recording medium such as an optical disk.

2. Discussion of Background

Heretofore, an optical head device for writing/reading an optical recording medium such as an optical disk, carries out writing/reading an information to/from optical disks having different cover thicknesses such as CD and DVD. Here, between optical disks having different cover thicknesses, the depths of their information recording planes for recording an information, from their disk surfaces (hereinafter simply referred to as the depth of information recording plane) are different. In order to enable writing/reading of a plurality of optical disks having information recording planes of different depths, an optical modulation element for switching a focal length is employed (refer to e.g. JP-A-9-230300; hereinafter referred to as Patent Document 1.).

Here, the optical modulation element disclosed in Patent Document 1 comprises a pair of transparent substrates, a liquid crystal sandwiched between these transparent substrates, an optical member having a Fresnel lens shape provided at an interface between the liquid crystal and one of the transparent substrates, and transparent electrodes for applying a voltage to the liquid crystal. The optical modulation element is configured to switch the voltage applied to the liquid crystal to switch alignment direction of the liquid crystal, to thereby switch the refractive index of the liquid crystal for incident light to switch presence and absence of Fresnel lens function of the optical member.

For the optical head device, usually, light polarized in a predetermined direction is used as incident light, and switching of the refractive index is carried out by making the alignment direction of the liquid crystal agree with the polarization direction of incident light. The refractive index of the liquid crystal is switched so that it agrees or differs from the refractive index of the optical member having a Fresnel lens shape before and after switching of a voltage applied to the liquid crystal.

Further, in order to improve recording density of an optical disk, an optical head device employing a laser diode emitting light of wavelength 405 nm, has been proposed. For the optical head device using this wavelength band, roughly two standards have been proposed. They are the Blu-ray standard which uses a cover layer of 0.1 mm thick made of transparent resin covering an information recording layer of an optical disk and uses an objective lens of NA (numerical aperture) 0.85, and the HDDVD standard which uses a cover layer of 0.6 mm thick and uses an objective lens of NA 0.65. Further, in each of the Blu-ray standard and the HDDVD standard, in order to increase information volume in each optical disk, optical disks having multi-layer information recording layers have been developed.

However, in such a conventional optical head device, since the liquid crystal in the optical modulation element is uniformly aligned, there has been a problem that for light polarized in a direction in which the liquid crystal shows the ordinary refractive index, the refractive index of the liquid crystal can not be switched by switching an applied voltage.

In an optical head device for writing/reading e.g. DVDs or high density optical disks (the Blu-ray standard or the HDDVD standard), in which a polarizing optical system is generally employed, it is possible to switch focal length of only one of outgoing light being light toward an optical disk and returning light being light reflected by the optical disk. For this reason, heretofore, in order to enable switching of focal lengths of both of outgoing light and returning light, an optical modulation element is provided for each of outgoing light and returning light, which causes e.g. increase of the size of optical head device, complication of driving, or increase of cost.

Further, in order to establish compatibility between the Blu-ray standard and the HDDVD standard, an element capable of variably changing a focal point depending on the difference of cover layer thickness, has been desired.

Further, an element for variably changing a focal point at a time of writing/reading layers of multi-layer optical disks of each standard, has been desired.

SUMMARY OF THE INVENTION

The present invention has been made to solve these problems, and it is an object of the present invention to provide a liquid crystal diffraction lens element capable of switching focal length of outgoing light and returning light by a single element, and an optical head device employing such an element.

Considering the above-mentioned points, the present invention provides the following contents.

1. A liquid crystal diffraction lens element comprising a pair of transparent substrates disposed in parallel, a liquid crystal sandwiched between the pair of transparent substrates, transparent electrodes for applying an electric field to the liquid crystal, a first birefringent Fresnel lens member formed between a first one of the transparent substrates and the liquid crystal, having a Fresnel lens shape and made of a birefringent material, and a second birefringent Fresnel lens member formed between a second one of the transparent substrates opposed to the first one of the transparent substrates and the liquid crystal, having a Fresnel lens shape and made of a birefringent material; wherein the extraordinary refractive index direction of the first birefringent Fresnel lens member and the extraordinary refractive index direction of the second birefringent Fresnel lens member are perpendicular to each other; and wherein the alignment direction of the liquid crystal at the interface between the liquid crystal and the first birefringent Fresnel lens member or the transparent electrode, and the alignment direction of the liquid crystal at the interface between the liquid crystal and the second birefringent Fresnel lens member or the transparent electrode, are perpendicular to each other.

According to this construction, by switching the alignment direction of liquid crystal by applying a voltage to the liquid crystal, it is possible to switch whether or not the first birefringent Fresnel lens member and the second birefringent Fresnel lens member function as Fresnel lenses for light having perpendicular polarization directions, and thus, it is possible to realize a liquid crystal diffraction lens element capable of switching focal lengths of both of outgoing light and returning light by a single element.

2. The liquid crystal diffraction lens element according to the above 1, wherein at least one of the birefringent material of the first birefringent Fresnel lens member and the birefringent material of the second birefringent Fresnel lens member, is a polymer liquid crystal.

According to this construction, besides the effect is of the construction of the above 1, since a polymer liquid crystal is employed for the birefringent material of at least one of the birefringent Fresnel lens members, forming of the birefringent Fresnel lens members is easy, and it is possible to realize a liquid crystal diffraction lens element whose refractive index is adjustable and which has high design flexibility since there are many variations of the polymer liquid crystal.

3. The liquid crystal diffraction lens element according to the above 1 or 2, wherein the liquid crystal and the birefringent Fresnel lens members have the same ordinary refractive index and the same extraordinary refractive index.

According to this construction, besides the effect of the construction of the above 1 or 2, since it is possible to switch presence or absence of Fresnel lens function of each of the birefringent Fresnel lens by switching on/off of applied voltage, it is possible to realize a liquid crystal diffraction lens element in which control of applied voltage is easy. Here, "the same" means a value within ±5% from a nominal refractive index.

4. The liquid crystal diffraction lens element according to any one of the above 1 to 3, wherein the shape of the first birefringent Fresnel lens member and the shape of the second birefringent Fresnel lens member are the same.

According to this construction, besides any one of the effects of the constructions of the above 1 to 3, since the shape of the first birefringent Fresnel lens member and the shape of the second birefringent Fresnel lens member are the same, it is possible to realize a liquid crystal diffraction lens element capable of changing focal length at the same magnification.

5. The liquid crystal diffraction lens element according to any one of the above 1 to 4, wherein the extraordinary refractive index directions of the first birefringent Fresnel lens member and the second birefringent Fresnel lens member, are parallel with the transparent substrate surfaces and twisted from each other about an axis perpendicular to the transparent substrate surfaces.

According to this construction, besides any one of the effects of the constructions of the above 1 to 4, since the extraordinary refractive index directions of the birefringent Fresnel lens members are twisted each other about an axis perpendicular to the transparent substrate surfaces, it is possible to make alignment direction of the liquid crystal agree with its extraordinary refractive index direction at the concave-convex portion of the birefringent Fresnel lens member, and thus, it is possible to realize a liquid crystal diffraction lens element capable of more suitably exhibiting a function of Fresnel lens.

6. The liquid crystal diffraction lens element according to any one of the above 1 to 5, wherein the liquid crystal diffraction lens element is integrated with a phase plate producing a phase difference of an odd number times of $\pi/2$ of wavelength of transmission light.

According to this construction, besides any one of the effects of the constructions of the above 1 to 5, since the element is integrated with the phase plate, it is possible to realize a liquid crystal diffraction lens element which is easily adjustable and which enables space saving.

7. The liquid crystal diffraction lens element according to any one of the above 1 to 6, wherein the alignment direction of the liquid crystal agrees with the extraordinary refractive index direction of each of the birefringent Fresnel lens members in the vicinity of the interface between the liquid crystal and the birefringent Fresnel lens member.

According to this construction, besides any one of the effects of the constructions of the above 1 to 6, since alignment direction of the liquid crystal agrees with the extraordinary refractive index direction of each of the birefringent Fresnel lens members in the vicinity of the interface between the liquid crystal and the birefringent Fresnel lens member, it is possible to realize a liquid crystal diffraction lens element capable of more suitably exhibiting a function of Fresnel lens. Here, "the same" includes a state in which deviation is in a degree not diminishing the effect of the invention. Specifically, "the same" includes a deviation of within about 10°.

8. The liquid crystal diffraction lens element according to any one of the above 1 to 7, wherein a part of each of the birefringent Fresnel lens members is made of an isotropic material.

According to this construction, besides any one of the effects of the above 1 to 7, it becomes possible to adjust birefringent index of entire Fresnel lens member made of an isotropic material and a birefringent material, and it is possible to realize a liquid crystal diffraction lens element having high design flexibility since there are many variations of the birefringent material and the liquid crystal to be used.

9. The liquid crystal diffraction lens element according to any one of the above 1 to 8, wherein a phase adjustment surface of concave-convex shape is integrated with at least one of the transparent substrates.

According to this construction, besides any one of the effects of the constructions of the above 1 to 8, since the phase adjustment surface can produce a transmission wavefront change independently from a transmission wavefront change produced by the Fresnel lens member and the liquid crystal, it is possible to realize a liquid crystal diffraction lens element having high design flexibility since there are many variations of transmission wavefront change.

10. The liquid crystal diffraction lens element according to the above 9, wherein the phase adjustment surface is made of a plurality of materials having refractive indexes of different temperature coefficients.

According to this construction, besides the effect of the construction of the above 9, it is possible to compensate temperature-related change of transmission wavefront caused by the difference of temperature coefficients of the refractive indexes of the Fresnel lens members and the liquid crystal. As a result it is possible to reduce temperature-related change of efficiency of producing transmission wavefront corresponding to a predetermined focal length.

11. An optical head device comprising a light source, a light-converging means for converging light emitted from the light source on an optical recording medium, the liquid crystal diffraction lens element as defined in any one of the above 1 to 10 disposed in an optical path between the light source and the light-converging means, and a photodetector for reading out an information from the optical recording medium.

According to this construction, it is possible to realize an optical head device having the effect of any one of the constructions of the above 1 to 10, and capable of improving light-utilization efficiency.

12. The optical head device according to claim 11, wherein the polarization direction of outgoing light incident into the liquid crystal diffraction lens element from the light source side, agrees with or is perpendicular to the extraordinary refractive index direction of the first birefringent Fresnel lens member disposed on the side of the liquid crystal diffraction lens element where the outgoing light is incident among the birefringent Fresnel lens members of the liquid crystal diffraction lens element.

According to this construction, besides the effect of the above 11, since the polarization direction of outgoing light agrees or is perpendicular to the extraordinary refractive index direction of the first birefringent Fresnel lens member, it is possible to realize an optical head device in which the first birefringent Fresnel lens member more suitably exhibits the function of Fresnel lens.

According to the present invention, by switching alignment direction of a liquid crystal by applying an electric field to the liquid crystal, the first birefringent Fresnel lens member and the second birefringent Fresnel lens member function as Fresnel lenses for light having perpendicular polarization directions, and thus, it is possible to realize a liquid crystal diffraction lens element and an optical head device capable of switching focal lengths of outgoing light and returning light by a single element.

DETAILED DESCRIPTION OF THE PREFERRED EMBODIMENTS

A first embodiment of the present invention is described below with reference to drawings.

First Embodiment

Figure 1:
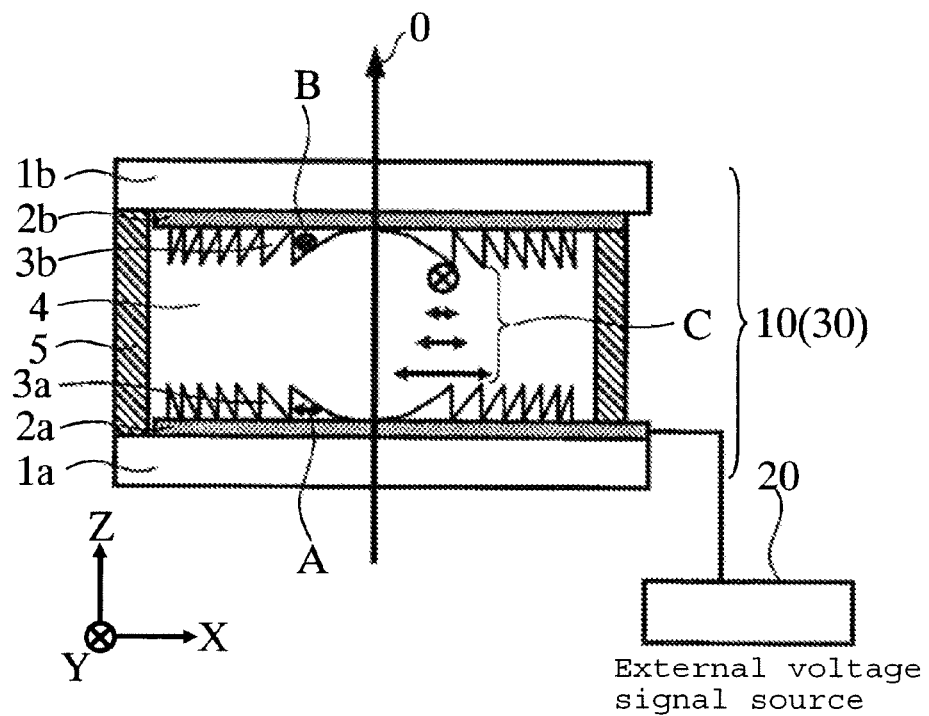
FIG. 1: A cross sectional view showing a conceptual construction of a liquid crystal diffraction lens element according to first and second embodiments of the present invention.
Figure 2:
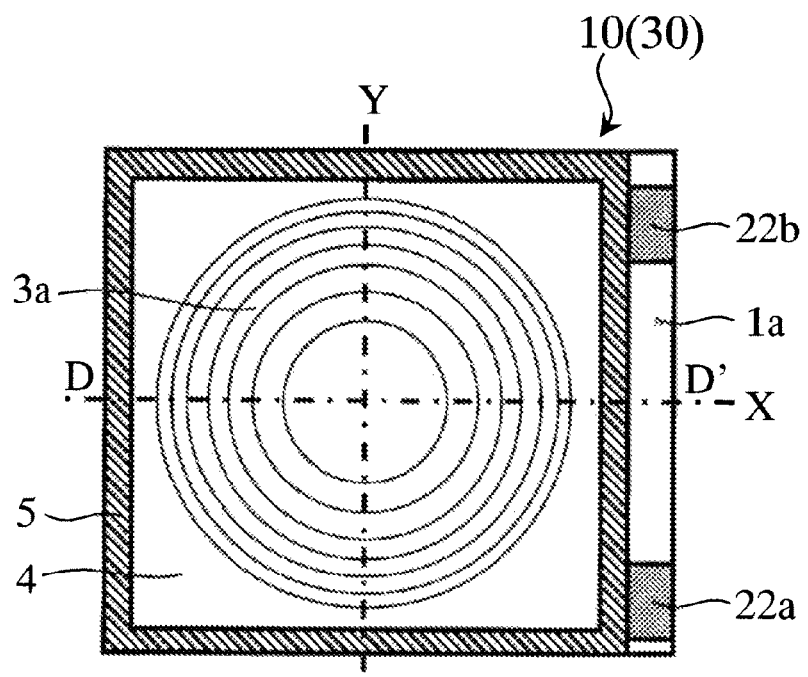
FIG. 2: A plan view showing a conceptual construction of a liquid crystal diffraction lens element according to an embodiment of the present invention.

FIG. 1 and FIG. 2 are respectively a cross sectional view and a plan view showing a conceptual construction of a liquid crystal diffraction lens element according to the first embodiment of the present invention. The cross sectional view shown in FIG. 1 shows a D-D' cross section of the liquid crystal diffraction lens element shown in FIG. 2. In FIG. 1 and FIG. 2, the liquid crystal diffraction lens element 10 comprises a pair of transparent substrates 1a, 1b disposed in parallel, a liquid crystal 4 sandwiched between the pair of transparent substrates 1a and 1b, transparent electrodes 2a, 2b for applying an electric field to the liquid crystal, a first birefringent Fresnel lens member 3a formed between the first transparent substrate 1a and the liquid crystal 4, having a Fresnel lens shape and made of a birefringent material, a second birefringent Fresnel lens member 3b formed between the second transparent substrate 1b opposed to the first transparent substrate 1a and the liquid crystal 4, having a Fresnel lens shape and made of a birefringent material, and a seal 5.

Here, for the transparent substrates 1a and 1b, for example, an acryl type resin, an epoxy type resin, a vinyl chloride type resin or polycarbonate may be employed, but from the viewpoint of e.g. durability, a glass substrate is suitable.

For the transparent electrodes 2a and 2b, a metal film of e.g. Au or Al may be employed, but a film made of e.g. ITO or $SnO_2$ is more suitable since it has higher transmittance of light and more excellent physical durability than metal films. The transparent electrodes 2a and 2b are configured to be connected with an external voltage signal source 20 so that a predetermined voltage signal output from the external voltage signal source 20 is applied to the liquid crystal 4. As the signal applied to the liquid crystal 4, a rectangular AC voltage signal is suitable and the frequency of the rectangular AC voltage signal is preferably from 10 Hz to 10 kHz. Further, it is extremely preferred to make DC component of the rectangular AC voltage signal sufficiently low level.

The birefringent Fresnel lens members 3a and 3b are each made of a birefringent material, and formed into a plurality of rings disposed concentrically around an optical axis 0 so that they function as a Fresnel lens in the vicinity of wavelength of incident light. Here, as the above-mentioned birefringent material, an inorganic material such as lithium niobate or quartz, or a polymer is liquid crystal etc. may be employed. Employing a polymer liquid crystal as the birefringent material, is suitable from the viewpoint of easiness of forming the birefringent Fresnel lens members 3a and 3b, capability of adjusting refractive indexes, and high design flexibility since there are many variations of polymer liquid crystal.

Further, each of the rings constituting the birefringent Fresnel lens members 3a and 3b, has a blazed shape to increase diffraction efficiency, and thus, the rings are referred to as blazed rings. Here, rings (hereinafter referred to as pseudo blazed rings) having a cross sectional shape (for example, D-D' cross section shown in FIG. 2) in a section containing the center axis of the blazed rings, is approximated by steps, may be employed instead of the above-mentioned blazed rings. Hereinafter, "blazed rings" include pseudo blazed rings.

Figure 3:
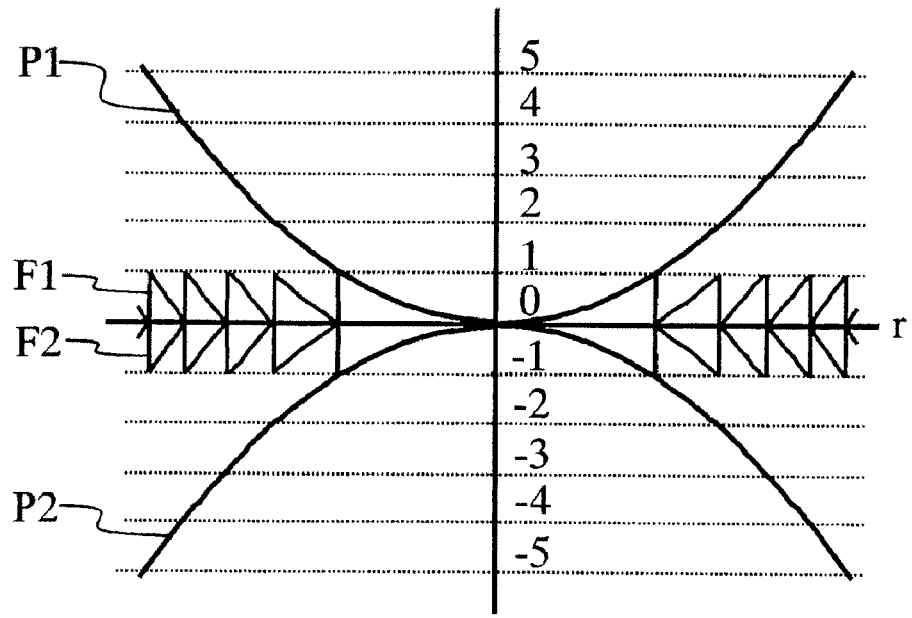
FIG. 3: An explanation view explaining the shape of a birefringent Fresnel lens member constituting the liquid crystal diffraction lens element according to the first embodiment of the present invention.

The blazed rings may be convex blazed rings projecting from a substrate surface, or may be concave blazed rings recessed into the substrate surface. The shapes of the birefringent Fresnel lens members 3a and 3b are described below with reference to FIG. 3. Curves indicated by symbols P1 and P2 in FIG. 3, show the distribution (hereinafter referred to as phase shift distribution) of phase shift amount added to light incident and transmitted through a predetermined lens, in a plane including the optical axis. Hereinafter, curves indicated by the symbols P1 and P2 are referred to as optical-axis-phase-shift curves.

Here, the distribution of the difference of phase shift amount (phase shift distribution) is obtained by subtracting a phase shift amount on the optical axis from the distribution of phase shift amount of light transmitted through the lens. The above-mentioned phase shift distribution is approximately rotational symmetry about the optical axis, and is a distribution switching focal point of incident light. Here, optical-axis-phase-shift curves indicated by the symbols P1 and P2, correspond to optical-axis-phase-shift curves of convex lens and concave lens respectively.

Here, the above phase shift distribution is represented by the following power series:

$$\phi(r) = a_1 r^2 + a_2 r^4 + a_3 r^6 + a_4 r^8 + \ldots$$

wherein r indicates a radial distance from the optical axis, $a_i$ (i=1, 2, 3, 4, ...) are each a constant, and $\phi(r)$ is the phase shift distribution at a distance r.

A phase shift distribution in a plane including the optical axis of light transmitted through each of the birefringent Fresnel lens members 3a, 3b becomes an optical-axis-phase-shift curve indicated by the symbol F1 (corresponding to P1) or F2 (corresponding to P2). Since light is not substantially changed by a phase difference of an integer times of wavelength, each of the birefringent Fresnel lens members 3a, 3b equivalently is changes the phase of incident light by the amount of a phase shift distribution having the optical-axis-phase-shift curve indicated by the symbol P1 or P2. Hereinafter, a phase shift distribution having an optical-axis-phase-shift curve indicated by a symbol F1 or F2, is simply referred to as "phase shift distribution indicated by a sign F1 or F2". Since a Fresnel lens itself is known, its further specific explanation is omitted.

Blazed rings constituting the birefringent Fresnel lens members 3a, 3b, each has a width in a radial direction and a thickness in an optical axis direction providing a phase shift distribution indicated by the symbol F1 or F2. The thickness of each of the blazed rings in the optical axis direction, is determined according to the birefringent material employed. In the example shown in FIG. 3, the maximum thickness of each blazed ring in the optical axis direction, is set so that the optical path difference becomes at most one wavelength. Here, it is preferred to make the shape of the first birefringent Fresnel lens member 3a the same as the shape of the second birefringent Fresnel lens member 3b, since such a construction enables to switch focal length at the same magnification.

The blazed rings may be formed by using a photolithography technique and an etching technique, they may be formed by employing a metal mold, or they may be formed by using other methods. Further, the birefringent material may be twisted about an axis in the direction of thickness, and preferably has a structure twisted by the amount of $90 \times d_F/d$ provided that the thickness of the birefringent material is $d_F$ and the maximum thickness of the liquid crystal 4 is d.

FIG. 1 shows birefringent Fresnel lens members 3a and 3b each constituted by convex blazed rings, and symbols A and B indicate directions (hereinafter referred to as extraordinary refractive index directions) in which the incident light feels the extraordinary refractive index. Namely, in the construction shown in FIG. 1, the extraordinary refractive index direction A of the birefringent Fresnel lens member 3a is in a direction (X axis direction) in parallel with substrates and the document face, the extraordinary refractive index direction B of the birefringent Fresnel lens member 3b is a direction (Y axis direction) in parallel with substrates and perpendicular to the document face.

The liquid crystal 4 is configured to have a twist alignment in which alignment direction (long axis direction of liquid crystal molecules) is twisted by 90° between the two transparent substrates 1a and 1b. The liquid crystal 4 is preferably a twisted nematic liquid crystal. The alignment of the liquid crystal 4 can be set by making the liquid crystal 4 contact with e.g. a surface produced by rubbing an alignment film of e.g. polyimide or polyvinyl alcohol (PVA), an optically aligned surface produced by irradiating a chemical material having a photo-reactive functional group with e.g. UV light polarized in a predetermined direction, a surface obtained by oblique vapor-deposition of e.g. SiO, or a surface obtained by irradiating e.g. a diamond-like carbon with an ion beam.

Here, it is preferred to form the birefringent Fresnel lens members 3a and 3b with a polymer liquid crystal and to align the liquid crystal 4 using the arrangement of molecules on the surface of the polymer liquid crystal since such a construction does not require alignment treatment using e.g. alignment films. Further, it is preferred to make alignment direction of the liquid crystal 4 agree with the extraordinary refractive index directions of the birefringent Fresnel lens members 3a and 3b in contact with the liquid crystal 4. Further, it is preferred to make the refractive index ($n_{lo}$, $n_{le}$) of the liquid crystal agree with the refractive index ($n_o$, $n_e$) of the birefringent material. Accordingly, in the construction shown in FIG. 1, it is preferred that as shown in the sign C, the alignment direction of the liquid crystal 4 is in a direction (extraordinary refractive index direction A) in parallel with the substrates and the document face at the interface with the birefringent Fresnel lens member 3a, and the alignment direction is in a direction (extraordinary refractive index direction B) in parallel with the substrates and perpendicular to the document face at the interface with the birefringent Fresnel lens member 3b, and the refractive indexes satisfy $n_{lo}=n_o$ and $n_{le}=n_e$.

The thickness of the liquid crystal 4 is preferably thick in a case of attaching importance to obtaining desired optical characteristics, and is preferably thin in a case of attaching importance to obtaining desired response speed. Further, the liquid crystal 4 may be one having a positive dielectric anisotropy ($\Delta \in$) or one having a negative dielectric anisotropy ($\Delta \in$). The difference of dielectric anisotropy ($\Delta \in$) is the difference whether the long axis direction of liquid crystal molecules is aligned in a direction of electric field or the long axis direction of liquid crystal molecules is aligned in a direction perpendicular to the electric field direction when the electric field is applied to the liquid crystal, and the dielectric anisotropy ($\Delta \in$) may be positive or negative. However, in a case where the dielectric anisotropy ($\Delta \in$) is negative, the liquid crystal 4 is preferably one whose alignment becomes generally perpendicular to the substrate surfaces when no voltage is applied.

The order of lamination of the above transparent substrate 1a or 1b, transparent electrode 2a or 2b, birefringent Fresnel lens member 3a or 3b, and liquid crystal 4, may be in this order but it is preferred to laminate them in the order of transparent substrate 1a or 1b, birefringent Fresnel lens member 3a or 3b, transparent electrode 2a or 2b and the liquid crystal 4 since an electric field can be uniformly applied to the liquid crystal 4 in this construction. Further, by employing a polymer liquid crystal as the birefringent material of the birefringent Fresnel lens members 3a and 3b and aligning the liquid crystal 4 by using the alignment direction of molecules of the polymer liquid crystal on the surface of the blazed rings, the twist in the polymer liquid crystal and the liquid crystal 4 portion about an axis in the thickness direction becomes uniform, such being remarkably preferred.

Here, it is preferred to provide an insulation film between the transparent electrodes 2a and 2b opposed to each other, to prevent short circuit. Such an insulation film may be formed by employing an inorganic material such as $SiO_2$, $ZrO_2$ or $TiO_2$ and carrying out e.g. a vacuum-film-deposition method such as sputtering, or a method of forming the film chemically by a sol-gel method. Further, as wires connecting the transparent electrodes 2a and 2b with an external voltage signal source 20, a flexible circuit board may be employed. In this case, in the liquid crystal diffraction lens element 10, the flexible circuit board is connected to terminal lead-out portions 22a and 22b of the transparent electrodes 2a and 2b.

The seal 5 for preventing the liquid crystal 4 from leaking out through a gap between the transparent substrates 1a and 1b, is provided at an outer periphery of an optically effective region to be secured. As the material of the seal 5, a resin type adhesive agent of e.g. epoxy or acryl type is suitable in terms of handling, but it may be a type curable by heat or irradiation with UV light. Further, in order to obtain a desired cell gap, the seal may contain a few % of a spacer such as a glass fiber.

Here, it is preferred to provide an antireflection film on a surface of each of the transparent substrates 1a and 1b opposite from the liquid crystal 4, since it improves utilization efficiency of light. As such an antireflection film, a dielectric multilayer film or a thin film in the order of wavelength etc. may be employed, but other films may also be employed. These films may be formed by e.g. a vapor deposition method or a sputtering method, but they may be formed by other methods.

Functions of the liquid crystal diffraction lens element 10 are described below with reference to FIG. 1. First of all, the functions in a case where no voltage is applied, is described. In this case, the liquid crystal 4 is aligned in the extraordinary refractive index directions A, B in the vicinities of the birefringent Fresnel lens members 3a, 3b respectively. Here, "liquid crystal is aligned" means that liquid crystal molecules are aligned. This definition applies to the following descriptions. In this construction, when light polarized in X axis direction and propagating in Z axis direction is incident into the liquid crystal diffraction lens element 10, since the liquid crystal 4 is aligned in the extraordinary refractive index direction A (X axis direction) at the interface with the birefringent Fresnel lens member 3a, and $n_{le}=n_e$ is satisfied, the incident light feels the same extraordinary refractive index, and thus, the Fresnel lens member 3a does not function as a Fresnel lens and the incident light is transmitted through the birefringent Fresnel lens member 3a as it is. Hereinafter, "transmitted as it is" is referred to as "pass through". With respect to the light transmitted through the birefringent Fresnel lens member 3a, since the liquid crystal 4 is twisted continuously so that the twist angle becomes 90° at the interface with the surface of the birefringent Fresnel lens member 3b, the light is incident into the birefringent Fresnel lens member 3b with its polarization direction rotated by 90°. Further, since the liquid crystal 4 is aligned in the extraordinary refractive index direction B (Y axis direction) at the interface with the birefringent Fresnel lens member 3b, and since $n_{le}=n_e$ is satisfied, the incident light feels the same extraordinary refractive index, and the birefringent Fresnel lens member 3b does not function as a Fresnel lens, and thus, the light is transmitted through the birefringent Fresnel lens member 3b as it is. As a result, light polarized in X axis direction and propagating in Z axis direction is converted so that its polarization direction becomes Y axis direction, but the light is transmitted without being influenced by the lens effect of the liquid crystal diffraction lens element.

The liquid crystal diffraction lens element 10 functions in the following manner for light polarized in Y axis direction and propagating in Z axis direction. Namely, when light polarized in Y axis direction and propagating in Z axis direction is incident into the liquid crystal diffraction lens element 10, since the liquid crystal 4 is aligned in the extraordinary refractive index direction A (X axis direction) at the interface with the birefringent Fresnel lens member 3a and since $n_{lo}=n_o$ is satisfied, the incident light feels the same ordinary refractive index, and the birefringent Fresnel lens member 3a does not function as a Fresnel lens, and thus, the incident light is transmitted through the birefringent Fresnel lens member 3a as it is. With respect to the light transmitted through the birefringent Fresnel lens member 3a, since the liquid crystal 4 is twisted continuously so that the twist angle becomes 90° at the interface with the birefringent Fresnel lens member 3b, the light is incident into the birefringent Fresnel lens member 3b with its polarization direction rotated by 90°. Further, since the liquid crystal 4 is aligned in the extraordinary refractive index direction B (Y axis direction) at the interface with the birefringent Fresnel lens member 3b and since $n_{lo}=n_o$ is satisfied, the incident light feels the same ordinary refractive index, and the birefringent Fresnel lens member 3b does not function as a Fresnel lens, and thus, the incident light is transmitted through the birefringent Fresnel lens member 3b as it is. As a result, the light polarized in Y axis direction and propagating in Z axis direction is, although its polarization direction is changed to X axis direction, transmitted without being influenced by the lens effect of the liquid crystal diffraction lens element. Accordingly, when no voltage is applied, the incident light is transmitted through the liquid crystal diffraction lens element 10 as it is regardless of whether or not its polarization direction is X axis direction or Y axis direction.

Then, a case where a voltage is applied to the liquid crystal 4 to align the liquid crystal 4 in Z axis direction, is described. In this case, when light polarized in X axis direction and propagating in Z axis direction is incident into the liquid crystal diffraction lens element 10, at the interface between the liquid crystal 4 and the birefringent Fresnel lens member 3a, the light feels the ordinary refractive index in the liquid crystal 4 side and the light feels the extraordinary refractive index in the birefringent Fresnel lens member 3a side and a refractive index difference is formed. Accordingly, the light receives a function of the birefringent Fresnel lens member 3a and is transformed into divergent light or convergent light to be output from the birefringent Fresnel lens member 3a. With respect to the light output from the birefringent Fresnel lens member 3a, at the interface between the liquid crystal 4 and the birefringent Fresnel lens member 3b, the light feels the ordinary refractive indexes on both the liquid crystal 4 side and the birefringent Fresnel lens member 3b side and $n_{lo}=n_o$ is satisfied, and thus, the light feels the same ordinary refractive index, and the light is transmitted through the birefringent Fresnel lens member 3b as it is. As a result, the light polarized in X axis direction and propagating in Z axis direction, receives the effect of the birefringent Fresnel lens member 3a to be transformed into divergent light or convergent light when it is transmitted through the liquid crystal diffraction lens element 10.

The liquid crystal diffraction lens element 10 functions in the following manner for light polarized in Y axis direction and propagating in Z axis direction. Namely, when light polarized in Y axis direction and propagating in Z axis direction is incident into the liquid crystal diffraction lens element 10, at the interface between the liquid crystal 4 and the birefringent Fresnel lens member 3a, the light feels the ordinary refractive indexes on both the liquid crystal 4 side and the birefringent Fresnel lens member 3a side and $n_{lo}=n_o$ is satisfied, and thus, the light feels the same ordinary refractive index and is transmitted through the birefringent Fresnel lens member 3a as it is. With respect to the light transmitted through the birefringent Fresnel lens member 3a, since at the interface between the liquid crystal 4 and the birefringent Fresnel lens member 3b, the light feels the ordinary refractive index on the liquid crystal 4 side and the light feels the extraordinary refractive index on the birefringent Fresnel lens member 3b side, and a refractive index difference is formed, and thus, the incident light receives the function of birefringent Fresnel lens member 3b and is transformed into divergent light or convergent light to be output from the birefringent Fresnel lens member 3b. As a result, the light polarized in Y axis direction and propagating in Z axis direction receives the function of the birefringent Fresnel lens member 3b, to be transformed into divergent light or convergent light when it is transmitted through the liquid crystal diffraction lens element 10.

Second Embodiment

The liquid crystal diffraction lens element 10 according to the first embodiment employs birefringent Fresnel lens members 3a and 3b made of a birefringent material and a liquid crystal 4, and has a construction that the refractive indexes ($n_o$, $n_e$) of the birefringent material agree with the refractive indexes ($n_{lo}$, $n_{le}$) of the liquid crystal 4. By this construction, when no voltages applied, light propagating in Z axis direction is, regardless of its polarization direction, transmitted through the liquid crystal diffraction lens element without generating diffraction light, and when a voltage is applied, the liquid crystal 4 is aligned in Z axis direction, and light propagating in Z axis direction receives the effects of the birefringent Fresnel lens members 3a and 3b to be divergent light or converging light and transmitted through the liquid crystal diffraction lens element 10.

However, it is difficult to make the refractive indexes ($n_o$, $n_e$) of the birefringent material and the refractive indexes ($n_{lo}$, $n_{le}$) of the liquid crystal 4 completely agree with each other, and usable birefringent material and liquid crystal material are limited. Particularly, in a case of employing a polymer liquid crystal for the birefringent material, its ordinary refractive index $n_o$ becomes larger than the ordinary refractive index $n_{lo}$ of the liquid crystal 4.

Thus, even in a case where the refractive indexes ($n_o$, $n_e$) of the birefringent material and the refractive indexes ($n_{lo}$, $n_{le}$) of the liquid crystal 4 are different from each other, it is effective to add a refractive-index-adjusting portion to realize the same function and effect of those of the first embodiment. The following embodiments (1) to (3) describe the liquid crystal diffraction lens element of the second embodiment provided with the refractive index adjusting portion.

Figure 4:
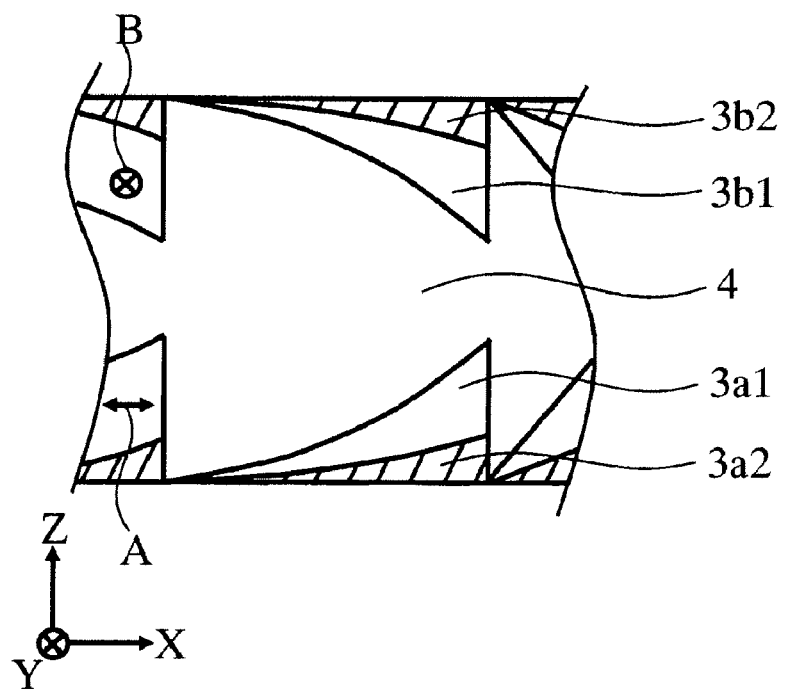
FIG. 4: An enlarged view of a cross section showing a conceptual construction of the liquid crystal diffraction lens element according to a second embodiment of the present invention.

(1) FIG. 4 is an enlarged cross sectional view showing a conceptual construction of an example of a liquid crystal diffraction lens element 30 according to the second embodiment of the present invention. Here, an example is shown, in which on transparent substrates 1a, 1b (not shown), refractive-index-adjusting portions 3a2, 3b2 of an isotropic material each having a Fresnel lens shape are formed, and subsequently, birefringent Fresnel lens members 3a1, 3b1 each having a Fresnel lens shape are formed. As compared with the liquid crystal diffraction lens element 10 according to the first embodiment, the liquid crystal diffraction lens element 30 is different in that the first birefringent Fresnel lens member 3a and the second birefringent Fresnel lens member 3b are constituted by birefringent materials 3a1, 3b1 and refractive index adjusting portions 3a2, 3b2 made of isotropic material, and the liquid crystal diffraction lens element 30 is the same as the liquid crystal diffraction lens element 10 in other constructions.

Here, by fabricating the birefringent Fresnel lens members 3a1, 3b1 and the refractive-index-adjusting portions 3a2, 3b2 so that the ratio $\alpha$: $1-\alpha$ ($0<\alpha<1$) between the optical path of the birefringent Fresnel lens member 3a1 or 3b1 made of a birefringent material having refractive indexes ($n_o$, $n_e$) for light propagating Z axis direction and the optical path of the refractive-index-adjusting portion 3a2 or 3b2 made of an isotropic material having a refractive index ($n_s$), becomes constant regardless of the position in XY plane, the birefringent Fresnel lens portions constituted by the birefringent Fresnel lens portions 3a1, 3b1 and the refractive index adjusting portions 3a2, 3b2, have an extraordinary refractive index of $\alpha \times n_e + (1-\alpha) \times n_s$ and an ordinary refractive index of $\alpha \times n_o + (1-\alpha) \times n_s$.

By constituting each of the birefringent Fresnel lens members by the birefringent material and the isotropic material, it is possible to adjust the ordinary refractive index and the extraordinary refractive index for incident light, there are many variations of birefringent material and liquid crystal to be used, and thus, it is possible to realize a liquid crystal diffraction element having high design flexibility.

Specifically, when $n_o > n_{lo}$, it is sufficient to employ refractive-index-adjusting portions 3a2, 3b2 made of an isotropic material of $n_{lo} > n_s$ and to adjust a so as to satisfy $n_{lo} = \alpha \times n_o + (1-\alpha) \times n_s$. Here, $n_{lo}$ is one of the refractive indexes of the liquid crystal 4.

The refractive-index-adjusting portions 3a2, 3b2 may be made of an isotropic material such as a glass or a resin, or a birefringent material such as a polymer liquid crystal, but it is preferably a transparent material.

The shapes of the refractive-index-adjusting portions 3a2, 3b2 may be formed by fabricating material layers on the transparent substrates 1a, 1b by an etching technique, or may be formed by pressing or molding by using a metal mold. Further, they may be formed by directly fabricating the transparent substrates 1a, 1b to form concave-convex shapes.

Figure 5:
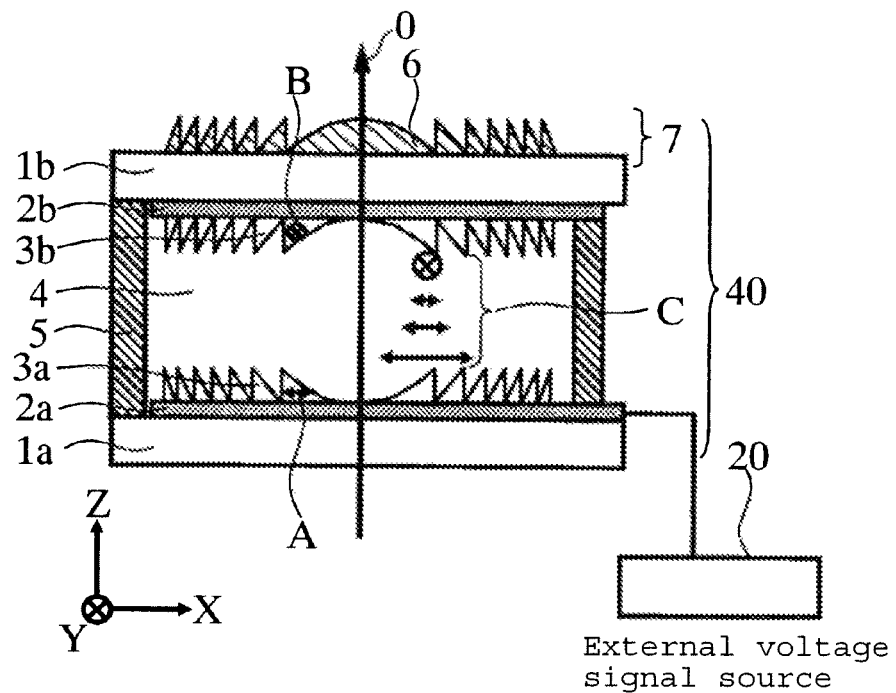
FIG. 5: A cross sectional view showing another conceptual construction of the liquid crystal diffraction lens element according to the second embodiment of the present invention.

(2) FIG. 5 is a cross sectional view showing a conceptual construction of an example of a liquid crystal diffraction lens element 40 according to the second embodiment of the present invention, in which instead of the refractive-index-adjusting portions 3a2, 3b2 of FIG. 4, a phase adjusting portion 7 is provided on one surface of the transparent substrate 1b of the liquid crystal diffraction lens element 10 according to the first embodiment in this construction.

Here, the phase adjusting portion 7 is constituted by a phase adjusting surface 6 formed on one surface of the transparent substrate 1a or 1b and having a Fresnel lens shape constituted by the same annular rings of those of the first and the second birefringent Fresnel lens members 3a, 3b. The phase adjusting surface 6 may be formed by directly fabricating a surface of the transparent substrate 1b by etching or press-molding, or it may be formed separately and bonded to the transparent substrate 1b. The material of the phase adjusting surface 6 may be any material such as a glass, a ceramics or a resin, but it is preferably transparent from a viewpoint of light-utilization efficiency.

Further, in a case where a birefringent material is employed for the phase adjusting surface 6, it becomes possible to carry out phase adjustments for ordinarily polarized light and extraordinarily polarized light independently, and thus, design flexibility increases.

By forming such a phase adjusting portion 7, it is possible to correct disturbance of transmission wavefront generated in a case where the refractive indexes ($n_o$, $n_e$) of the birefringent material of the birefringent Fresnel lens members 3a, 3b are different from the refractive indexes ($n_{lo}$, $n_{le}$) of the liquid crystal 4, and thus, functions and effects equivalent to those of the first embodiment are obtained.

For example, in a case where $n_o > n_{lo}$ is satisfied, at no voltage application, transmission wavefront of light propagating in Z axis direction is disturbed according to the refractive index difference ($n_o - n_{lo}$) between the birefringent Fresnel lens members 3a, 3b and the liquid crystal 4 and according to the shape of the birefringent Fresnel lens members. As a result, transmittance of light "passing through" the element decreases.

Here, by forming the phase adjusting surface 6 with an isotropic material of refractive index $n_s$ so as to correct disturbance of transmission wavefront of light propagating in Z axis direction, it is possible to solve the problem of lowering transmittance of the element for the light "passing through".

Specifically, provided that the maximum depth of the birefringent Fresnel lens members 3a and 3b is designated as d, the maximum optical path difference for ordinarily polarized light propagating in Z axis direction generated by the birefringent Fresnel lens members 3a and 3b and the liquid crystal 4, becomes $(n_o-n_{lo})\times d$. To correct this maximum optical path difference, it is sufficient that the maximum depth D of the phase adjusting surface 6 of the Fresnel lens shape satisfies an equation $(n_s-1)\times D=(n_o-n_{lo})\times d$ and that the Fresnel lens shape has reversed concaves and convexes as shown in FIG. 5.

Here, in order to satisfy the maximum diffraction conditions of a system including the birefringent Fresnel lens members 3a, 3b, the liquid crystal 4 and the phase adjusting surface 6 at an applied voltage at which the refractive index of the liquid crystal 4 becomes equivalent to $n_o$, and to produce divergent light or convergent light efficiently, it is preferred that $\{(n_e-n_{lo})\times d-(n_s-1)\times D\}$ is approximately equal to the wavelength $\lambda$ of incident light.

FIG. 5 shows an example in which the phase adjusting surface 6 is formed on the transparent substrate 1b on the light-output side, but it may be formed on the transparent substrate 1a on the light-input side, or it may be formed on both light input side and light output side.

Further, the distance between the phase adjusting surface 6 and the birefringent Fresnel lens members 3a, 3b is preferably as short as possible. Accordingly, the thickness of the transparent substrate 1b is preferably thin.

Further, the phase adjusting surface 6 may have a Fresnel lens shape whose cross section is approximated by steps. Here, the transparent substrates 1a and 1b are joined by a seal 5.

Figure 6:
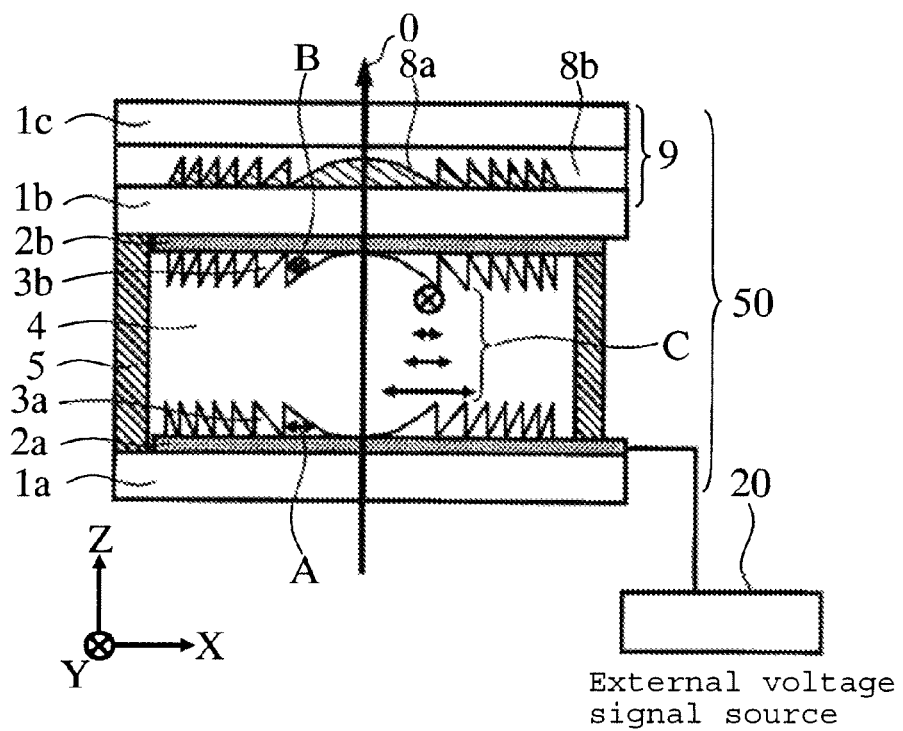
FIG. 6: A cross sectional view showing another conceptual construction of the liquid crystal diffraction lens element according to the second embodiment of the present invention.

(3) FIG. 6 is a cross sectional view showing a conceptual construction of an example of a liquid crystal diffraction lens element 50 in which instead of the phase adjusting portion 7 of FIG. 5, a phase adjusting surface 8a made of an isotropic material of refractive index $n_{s1}$ fabricated into a Fresnel lens shape is formed on one surface of the transparent substrate 1b, and at least concave portions of its concave-convex portion are filled with a filler 8b being an isotropic material of refractive index $n_{s2}$ ($n_{s2}<n_{s1}$) to constitute a phase adjusting portion 9 sandwiched between the transparent substrate 1b and a transparent substrate 1c.

As compared with the liquid crystal diffraction lens element 40, in the case of the liquid crystal diffraction lens element 50, design and production of the phase adjusting surface become more flexible since the refractive indexes of the phase adjusting surface 8a and the filler 8b are adjustable, such being preferred.

The filler 8b fills the concave-convex portions of the phase adjusting surface 8a and bonds and fixes the transparent substrates 1b and 1c. For the filler 8b, an adhesive agent of thermosetting epoxy type or photocurable acryl type, may be used.

Further, in a case where the temperature dependence of the refractive index of the birefringent Fresnel lens members 3a, 3b and that of the liquid crystal 4 are different, there occurs a problem that efficiency of transmission wavefront deviates from a desired value according to temperature change of the liquid crystal diffraction lens element. Here, by employing materials having refractive indexes of different temperature-dependences, for the phase adjusting surface 8a and the filler 8b, it is possible to compensate the temperature dependencies of the Fresnel lens members 3a, 3b and the liquid crystal 4, to improve temperature dependence of the liquid crystal diffraction lens element 50.

In the first and second embodiments, explanations have been made to a case where the birefringent Fresnel lens members 3a, 3b each has a concentric annular Fresnel lens shape, but they may be birefringent materials having another cross sectional shape.

For example, instead of the birefringent Fresnel lens members 3a, 3b, by making the cross section a parabolic shape, a focal-length-switching lens producing transmission wavefront of divergent light or convergent light according to applied voltage, is constituted. Further, by forming the cross section into a shape corresponding to a spherical aberration or a shape corresponding to astigmatism, it is possible to add an aberration component to a transmission wavefront according to an applied voltage. In any of these cases, by adjusting cross sectional shapes of the birefringent materials corresponding to the birefringent Fresnel lens members 3a and 3b, it is possible to obtain a change of transmission wavefront not depending on polarization direction of incident light. Here, the transparent substrates 1a and 1b are bonded by a seal 5.

Since a polarization state of incident light can be represented by a composition of light components having perpendicular polarization directions, the liquid crystal diffraction lens element of the present invention producing a change of transmission wavefront not depending on polarization direction of incident light, can produce a change of transmission wavefront without depending on polarization direction of incident light.

Third Embodiment

Figure 7:
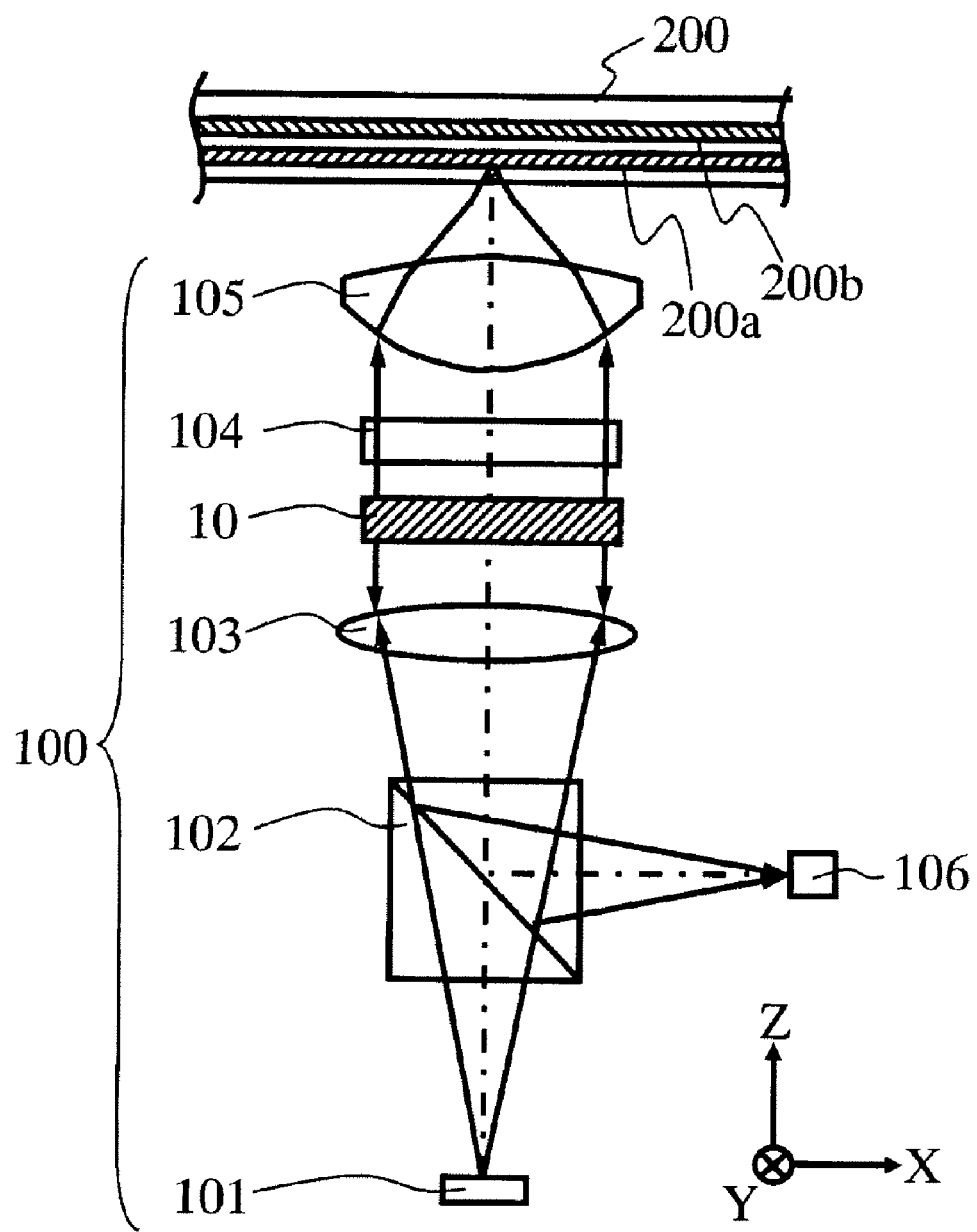
FIG. 7: A view showing a conceptual construction of an optical head device according to an embodiment of the present invention.

Then, an optical head device according to the third embodiment of the present invention is described with reference to drawings. FIG. 7 is a view showing a conceptual construction of an optical head device according to an embodiment of the present invention. In FIG. 7, an optical head device 100 comprises a light source 101 emitting a light flux of predetermined wavelength, a polarizing beam splitter 102 transmitting or reflecting light according to polarization direction of the light, a collimator lens 103 transforming incident light flux into substantially parallel light, a liquid crystal diffraction lens element 10, a quarter wavelength plate 104, an objective lens 105 for converging light transmitted through the quarter wavelength plate 104 on an optical disk 200, and a photodetector 106 for detecting returning light from the optical disk 200 reflected by the polarizing beam splitter 102. Here, the "returning light" means light emitted from the light source 101, reflected by the information recording layers 200a, 200b and returning towards the liquid crystal diffraction lens element 10.

Light emitted by the light source 101 is transmitted through the polarizing beam splitter 200, the collimator lens 103, the liquid crystal lens element 10, the quarter wavelength plate 104 and the objective lens 105 in this order, and converged on an information recording plane 200a or 200b being one of two information recording planes of the optical disk 200. The light fluxes converged on the information recording planes 200a and 200b of the optical disk 200 are reflected by the information recording planes 200a and 200b respectively, each transmitted through the objective lens 105, the quarter wavelength plate 104, the liquid crystal diffraction lens element 10 and the collimator lens 103, reflected by the polarizing beam splitter 102 and incident into the photodetector 106.

Here, an output electrical signal of the photodetector 106 is used for producing a read-out signal of an information recorded in the information recording plane 200a or 200b of the optical disk 200, a focus error signal and a tracking error signal. Here, the optical head device has a mechanism (focus servo) for controlling a lens in an optical axis direction according to the focus error signal, and a mechanism (tracking servo) for controlling the lens in an approximately perpendicular direction according to the tracking error signal, but they are omitted in the construction shown in FIG. 7.

The light source 101 is, for example, constituted by a laser diode and configured to output linearly polarized divergent light of wavelength in the vicinity of 650 nm. Here, the above-mentioned light source 101 may be a so-called hybrid type two-wavelength laser light source in which two laser diodes are mounted on a single substrate in a single package, or may be a monolithic type two-wavelength laser light source (for example, refer to JP-A-2004-39898) having two emission points emitting different wavelengths. In this case, the light source 101 is configured to emit linearly polarized divergent light having, for example, a wavelength in the vicinity of 650 nm and a wavelength in the vicinity of 780 nm. Here, the wavelengths in the vicinity of 650 nm and in the vicinity of 780 nm, mean wavelengths within ranges of 630 nm to 670 nm and 760 nm to 800 nm respectively. Further, a blue laser diode in the vicinity of 405 nm employed in the Blu-ray standard or the HDDVD standard, may be employed. The wavelength in the vicinity of 405 nm in this case means a wavelength within a range of 385 nm to 425 nm.

Here, the polarizing beam splitter 102, the collimator lens 103, the quarter wavelength plate 104, the objective lens 105 and the photodetector 106 are known, and thus, their further explanations are omitted.

From now, operations of the optical head device 100 are described. Light emitted from the light source 101 is transmitted through the polarizing beam splitter 102, transformed into substantially parallel light beam by the collimator lens 103, and incident into the liquid crystal diffraction lens element 10 as the light remains linearly polarized light. Here, the polarization direction of light emitted by the light source 101 agrees with or is perpendicular to the extraordinary refractive index direction of the first birefringent Fresnel lens member 3a provided on a side where the outgoing light is incident among birefringent Fresnel lens members 3a, 3b employed in the liquid crystal diffraction lens element 10. Light incident into the liquid crystal diffraction lens element 10 is transmitted with its focal length changed in a case where a predetermined voltage signal is applied to the liquid crystal lens element 10, and the light is transmitted with its focal length unchanged and with its polarization direction changed by 90° when no voltage signal is applied to the liquid crystal diffraction lens element 10, and incident into the quarter wavelength plate 104.

Light incident into the quarter wavelength plate 104 is transformed into circularly polarized light by the quarter wavelength plate 104, and converged on the information recording plane 200a or 200b of the optical disk 200 by the objective lens 105.

Here, when no voltage is applied to the liquid crystal lens element 10, transmission wavefront through the liquid crystal lens element 10 is not changed from that of incident light, the light is converged on the information recording plane 200a of the optical disk 200 by the objective lens 105, to carry out writing or reading. On the other hand, when a predetermined voltage is applied to the liquid crystal lens element 10, transmission wavefront through the liquid crystal lens is element 10 in response to incident light becomes a divergent wavefront of concave lens, the light is converged on the information recording plane 200b of the optical disk 200 by the objective lens 105, to carry out writing or reading. As a result, stable writing and reading to/from the double-layer optical disk 200 is realized.

Returning light from the optical disk 200 is transmitted through the objective lens 105, transformed by the quarter wavelength plate 104 into linearly polarized light whose polarization direction is different by 90° from that of outgoing light incident into the quarter wavelength plate 104, and the returning light is transmitted with its focal length unchanged or switched by the liquid crystal diffraction lens element 10 according polarization direction of the light and voltage signal applied to the liquid crystal diffraction lens element 10. The light transmitted through the liquid crystal diffraction lens element 10 is transmitted through the collimator lens 103, reflected by the polarizing beam splitter 102 and incident into the photodetector 106, and an information recorded into the photodetector 106 is converted to an electrical signal.

Here, integration of the liquid crystal diffraction lens element 10 with the quarter wavelength plate 104 is extremely effective from a viewpoint of e.g. easiness of adjustment and space saving.

Further, it becomes necessary to correct a spherical aberration generated due to the difference of cover thicknesses to obtain compatibility between the Blu-ray standard and the HDDVD standard. By switching a focal point by using the liquid crystal diffraction lens element of the present invention, it becomes possible to write or read to/from optical disks of Blu-ray standard and HDDVD standard by using a single optical head device.

Further, in each of the Blu-ray standard and the HDDVD standard, at a time of writing or reading to/from layers of multilayer optical disks, it is necessary to correct a spherical aberration generated due to the difference of cover thicknesses. Also in this case, by switching a focal point by using the liquid crystal diffraction lens element of the present invention, it becomes possible to write or read to/from such a multilayer optical disk by using a single optical head device.

Further characteristics of the liquid crystal diffraction lens element and the optical head device of the present invention, are more specifically described with reference to the following Examples.

EXAMPLES

Example 1

A liquid crystal diffraction lens element 10 according to Example 1 of the present invention is described with reference to FIG. 1. The liquid crystal diffraction lens element 10 according to this example comprises a pair of transparent substrates 1a, 1b disposed in parallel, a liquid crystal 4 sandwiched between the pair of transparent substrates 1a, 1b, transparent electrodes 2a, 2b for applying electric field to the liquid crystal, a first birefringent Fresnel lens member 3a formed between the first transparent substrate 1a and the liquid crystal 4 having a Fresnel lens shape and made of a birefringent material, a second birefringent Fresnel lens member 3b formed between the second transparent substrate 1b opposed to the first transparent substrate 1a and the liquid crystal 4, having a Fresnel lens shape and made of a birefringent material, and a seal 5.

First of all, quartz glass plates were employed for the transparent substrates 1a, 1b. ITO was employed for the material of the transparent electrodes 2a, 2b. Forming of the transparent electrodes 2a, 2b was such that ITO is deposited by a sputtering method until it had a film thickness providing a sheet resistance of about 300 Ω/□, and the ITO film was patterned by a photolithography technique and an etching technique.

As the birefringent material of the birefringent Fresnel lens members 3a, 3b, a polymer liquid crystal having an extraordinary refractive index $n_e$ of 1.77 and an ordinary refractive index $n_o$ of 1.55 was employed. The birefringent Fresnel lens members 3a, 3b were formed in the following manner. First of all, a polymer liquid crystal having a film thickness of 3 μm was formed on the transparent electrodes 2a, 2b so that its extraordinary refractive index direction became X axis direction as shown in FIG. 1 on the transparent substrate 1a side, and the extraordinary refractive index direction became Y axis direction as shown in FIG. 1 on the transparent substrate 1b side. Here, the transparent substrate 1a is in the light-incident side, and the transparent substrate 1b is in the light-output side. Further, the polymer liquid crystal as the birefringent material has its extraordinary refractive index direction not twisted about an axis in the direction of thickness.

After the polymer liquid crystal as the birefringent material was formed, the polymer liquid crystal as the birefringent material was patterned by using a photolithography technique and an etching technique, to form blazed rings. Here, the thickness of the blazed rings in the optical axis direction was made so as to produce the phase shift distribution indicated by the sign F2 in FIG. 3 provided that the wavelength of the light source 101 was 660 nm.

Then, on the surface of each of the birefringent Fresnel lens members 3a, 3b, a polyimide film (not shown) was formed as an alignment film, and an alignment treatment was applied to the polyimide film by a rubbing is method. The rubbing is carried out so that its direction agree with the extraordinary refractive index direction of the polymer liquid crystal of each of the birefringent Fresnel lens members 3a, 3b.

As the material of seal 5, an epoxy resin type adhesive agent mixed with glass beads having a diameter of 40 μm as a spacer, was employed, and it was printed in the outer periphery of the optically effective region as shown in FIG. 2, and thermo-press-bonded to form a liquid crystal cell having an intersubstrate gap of 40 μm. Into the liquid crystal cell, as the liquid crystal 4, a nematic liquid crystal having an ordinary refractive index of 1.55, an extraordinary refractive index of 1.77 and a dielectric anisotropy (Δ∈) of 14 was injected by using a vacuum injection method. To the nematic liquid crystal, a chiral agent producing a chiral pitch of 200 μm was added.

After the liquid crystal 4 was injected into the liquid crystal cell, its injection port was sealed by employing an acryl resin type adhesive agent to form the liquid crystal diffraction lens element 10. At a time of forming the transparent electrodes 2a, 2b, terminal lead-out portions 22a, 22b were provided with the transparent electrodes 2a, 2b, and to the terminal lead-out portions 22a, 22b, a flexible circuit board was connected, which allowed the element to be connected with an external voltage signal source 20 producing a rectangular AC voltage signal having a frequency of 1,000 Hz.

Functions of the liquid crystal diffraction lens element 10 thus constituted when linearly polarized (polarized in X axis direction or Y axis direction) laser beam of wavelength of 660 nm is incident into the liquid crystal diffraction lens element 10, are described below.

First of all, a case where no voltage is applied (applied voltage is 0 Vrms) is described. In this case, the liquid crystal 4 is aligned in the extraordinary refractive index directions A, B in the vicinity of the birefringent Fresnel lens members 3a, 3b. At this time, when light polarized in X axis direction and propagating in Z axis direction is incident into the liquid crystal diffraction lens element 10, since the liquid crystal 4 is aligned in the extraordinary refractive index direction A (X axis direction) at the interface with the birefringent Fresnel lens member 3a, and $n_{le}=n_e$ is satisfied, the light feels the same extraordinary refractive indexes and the birefringent Fresnel lens member 3a does not function as a Fresnel lens, and thus, the incident light is transmitted through the birefringent Fresnel lens member 3a as it is. With respect to the light transmitted through the birefringent Fresnel lens member 3a, since the liquid crystal 4 is twisted continuously so that the twist angle becomes 90° at the interface with the birefringent Fresnel lens member 3b, the light is incident into the birefringent Fresnel lens member 3b with its polarization direction rotated by 90°. Further, since the liquid crystal 4 is aligned in the extraordinary refractive index direction B (Y axis direction) at the interface with the birefringent Fresnel lens member 3b, and $n_{le}=n_e$ is satisfied, the incident light feels the same extraordinary refractive index direction, and the birefringent Fresnel lens member 3b does not function as a Fresnel lens, and the incident light is transmitted through the birefringent Fresnel lens member 3b as it is. As a result, light polarized in X axis direction and propagating in Z axis direction is, although its polarization direction is changed to Y axis direction, transmitted through the liquid crystal diffraction lens element without receiving its lens effect.

The liquid crystal diffraction lens element functions as follows to light polarized in Y axis direction and propagating in Z axis direction. Namely, when the light polarized in Y axis direction and propagating in Z axis direction is incident into the liquid crystal diffraction lens element 10, since the liquid crystal 4 is aligned in the extraordinary refractive index direction A (X axis direction) at the interface with the birefringent Fresnel lens member 3a, and $n_{lo}=n_o$ is satisfied, the incident light feels the same ordinary refractive index and the birefringent Fresnel lens member 3a does not function as a Fresnel lens, and thus, the incident light is transmitted through the birefringent Fresnel lens member 3a as it is. With respect to the light transmitted through the birefringent Fresnel lens member 3a, since the liquid crystal 4 is twisted continuously so that the twist angle becomes 90° at the interface with the birefringent Fresnel lens member 3b, the light is incident into the birefringent Fresnel lens member 3b with its polarization direction rotated by 90°. Further, since the liquid crystal 4 is aligned in the extraordinary refractive index direction B (Y axis direction) at the interface with the birefringent Fresnel lens member 3b, and $n_{lo}=n_o$ is satisfied, the incident light feels the same ordinary refractive index, and the birefringent Fresnel lens member 3b does not function for the incident light, and thus, the incident light is transmitted through the birefringent Fresnel lens member 3b as it is. As a result, light polarized in Y axis direction and propagating in Z axis direction is, although its polarization direction is changed to X axis direction, transmitted through the liquid crystal diffraction lens element without having its lens effect. Accordingly, when no voltages is applied, regardless of the polarization direction whether it is in X axis direction or in Y axis direction, the incident light is transmitted through the liquid crystal diffraction lens element 10 as it is.

Then, in a case where an effective voltage of 10 Vrms is applied and the alignment of the liquid crystal 4 thereby becomes substantially perpendicular to the substrate surfaces, is described. In this case, when light polarized in X axis direction and propagating in Z axis direction is incident into the liquid crystal diffraction lens element 10, since at the interface between the liquid crystal 4 and the birefringent Fresnel lens member 3a, the incident light feels the ordinary refractive index in the liquid crystal 4 side and the incident light feels the extraordinary refractive index in the birefringent Fresnel lens member 3a side, a refractive index difference is produced. Accordingly, the incident light receives an effect of the birefringent Fresnel lens member 3a and is transformed into divergent light to be output from the birefringent Fresnel lens member 3a. With respect to the light output from the birefringent Fresnel lens member 3a, since at the interface between the liquid crystal 4 and the birefringent Fresnel lens member 3b, the incident light feels the ordinary refractive index both in the liquid crystal 4 side and the birefringent Fresnel lens member 3b side, and $n_{lo}=n_o$ is satisfied, the incident light feels the same ordinary refractive index, and thus, the incident light is transmitted through the birefringent Fresnel lens member 3b as it is. As a result, the light polarized in X axis direction and propagating in Z axis direction receives the effect of the birefringent Fresnel lens member 3a and transformed into divergent light as it is transmitted through the liquid crystal diffraction lens element 10.

The liquid crystal diffraction lens element 10 functions as follows for light polarized in Y axis direction and propagating in Z axis direction. Namely, when light polarized in Y axis direction and propagating in Z axis direction is incident into the liquid crystal diffraction lens element 10, since at the interface between the liquid crystal 4 and the birefringent Fresnel lens member 3a, the incident light feels the ordinary refractive index both in the liquid crystal 4 side and the birefringent Fresnel lens member 3a side and $n_{lo}=n_o$ is satisfied, the incident light feels the same ordinary refractive index and the light is transmitted through the birefringent Fresnel lens member 3a as it is. With respect to the light transmitted through the birefringent Fresnel lens member 3a, since at the interface between the liquid crystal 4 and the birefringent Fresnel lens member 3b, the incident light feels the ordinary refractive index in the liquid crystal 4 side and the incident light feels the extraordinary refractive index in the birefringent Fresnel lens member 3b side, a refractive index differences produced. Accordingly, the light receives the effect of the birefringent Fresnel lens member 3b and is transformed into divergent light to be output from the birefringent Fresnel lens member 3b. As a result, the light polarized in Y axis direction and propagating in Z axis direction received the effect of the birefringent Fresnel lens member 3b and was transformed into divergent light as it was transmitted through the liquid crystal diffraction lens element 10.

As described above, a liquid crystal diffraction lens element 10 was obtained, which can switch its function so that both of linearly polarized light polarized in X axis direction and linearly polarized light polarized in Y axis direction, each "passes through" the liquid crystal diffraction lens element 10 when no voltage is applied (application voltage is 0 V), and the light becomes divergent light when an effective voltage of 10 Vrms is applied.

Example 2

A liquid crystal diffraction lens element 30 according to Example 2 of the present invention is described with reference to FIG. 4 being its enlarged cross sectional view.

As transparent substrates 1a, 1b (not shown), quartz glass substrates having a refractive index of 1.46 and a thickness of 0.7 mm, is employed, one surface of each of them is etched to have a Fresnel lens shape so that the depth of its annular rings is 3.6 μm by photolithography and etching techniques, to produce refractive index adjusting portions 3a2 and 3b2.

Then, on the refractive index adjusting portions is 3a2, 3b2, an ITO film (not shown) having a sheet resistance of 300 Ω/□ is formed as transparent electrodes by a sputtering method, and the ITO is patterned by photolithography and etching techniques to produce the electrodes.

Further, on the ITO film surface, as a birefringent material, a film of polymer liquid crystal having an extraordinary refractive index ($n_e$) of 1.77 and an ordinary refractive index ($n_o$) of 1.55 is formed to have a film thickness of 3.0 μm, and processed by photolithography and etching techniques to produce the birefringent Fresnel lens members 3a1, 3b1 shown in FIG. 4. Here, the alignment (direction of extraordinary refractive index) of the polymer liquid crystal is aligned in X axis direction in the birefringent Fresnel lens member 3a1 and in Y axis direction in the birefringent Fresnel lens member 3b1.

Further, on the surface of each of the birefringent Fresnel lens members 3a1, 3b1, a film of polyimide is formed (not shown) and subjected to an alignment treatment by a rubbing method so that the alignment treatment direction on the surface of the polymer liquid crystal becomes the extraordinary refractive index direction of the polymer liquid crystal.

Then, as shown in FIG. 2, a seal 5 made of an epoxy adhesive agent mixed with a fiber spacer having a diameter of 40 μm, is printed in the outer periphery and thermo-press-bonded to form a cell having an intersubstrate gap of 40 μm.

Subsequently, into this cell, a nematic liquid crystal having an ordinary refractive index of 1.5, an extraordinary refractive index of 1.6 and a dielectric anisotropy ($\Delta\in$) of 10 and added with a chiral agent providing a chiral pitch of 200 μm, is injected by a vacuum injection method and the injection port is sealed with an acryl type adhesive agent to produce a liquid crystal diffraction lens element 30.

By thus constituting the liquid crystal diffraction lens element 30, even in a case where the refractive indexes of the birefringent Fresnel lens members 3a1, 3b1 and the liquid crystal 4 are different from each other, functions equivalent to those of the liquid crystal diffraction lens element 10 of Example 1 can be realized.

Example 3

A liquid crystal diffraction lens element 40 according to Example 3 of the present invention, is described with reference to FIG. 5 being its cross sectional view.

As transparent substrates 1a, 1b, quartz glass substrates having a refractive index of 1.46 and a thickness of 0.7 mm are employed, and on each of the quartz glass substrates, an ITO film having a sheet resistance of 300 Ω/□ is formed as a transparent electrode by using a sputtering method, and the ITO film is patterned by photolithography and etching techniques to produce transparent electrodes 2a, 2b.

Subsequently, a surface of the transparent substrate 1b opposite from the surface on which the ITO film is formed, is fabricated into a Fresnel lens shape whose depth is 0.29 μm by photolithography and etching techniques, to produce a phase adjusting surface 6 shown in FIG. 5.

Further, on the surface on which the ITO film is formed, as a birefringent material, a film of polymer liquid crystal having an extraordinary refractive index ($n_e$) of 1.77 and an ordinary refractive index ($n_o$) of 1.55 is formed so that its film thickness becomes 3.3 μm, and processed by photolithography and etching techniques to produce birefringent Fresnel lens members 3a, 3b shown in FIG. 5. Here, the alignment (direction of extraordinary refractive index) of the polymer liquid crystal is aligned in X axis direction in the birefringent Fresnel lens member 3a and in Y axis direction in the birefringent Fresnel lens member 3b.

Further, on surfaces of the birefringent Fresnel lens members 3a, 3b, a film of polyimide is formed (not shown) as alignment films, and subjected to alignment treatment by a rubbing method so that the alignment treatment direction of the surface of the polymer liquid crystal becomes the extraordinary refractive index direction of the polymer liquid crystal.

Subsequently, as shown in FIG. 5, a seal 5 being an epoxy adhesive agent mixed with a fiber spacer having a diameter of 40 μm, is printed in the outer periphery, and thermo-press-bonded to produce a cell having an intersubstrate gap of 40 μm.

Then, into this cell, a nematic liquid crystal having an ordinary refractive index of 1.51, an extraordinary refractive index of 1.73 and a dielectric anisotropy (Δ∈) of 10 and added with a chiral agent producing a chiral pitch of 200 μm, is injected by a vacuum injection method, and the injection port is sealed with an acryl type adhesive agent to produce a liquid crystal diffraction lens element 40.

By thus constituting the liquid crystal diffraction lens element 40, even in a case where the refractive indexes of the birefringent Fresnel lens members 3a, 3b and the liquid crystal 4 are different from each other, functions equivalent to those of the liquid crystal diffraction lens element 10 of Example 1 can be realized.

Example 4

A liquid crystal diffraction lens element 50 according to Example 4 of the present invention is described with reference to FIG. 6 being its cross sectional view.

The liquid crystal lens element 50 is different from the element of Example 3 in the phase adjusting portion 9, but they are the same in other constructions.

A surface of the quartz glass substrate being the transparent substrate 1b opposite from the surface on which the ITO film is formed, is fabricated into a Fresnel lens shape of 3 μm deep by photolithography and etching techniques, to produce the phase adjusting surface 8a shown in FIG. 6.

Then, using an acryl type photocurable type adhesive agent having a refractive index of 1.504, is used as a filler 8b, to fill concave portions of the phase adjusting surface 8a and to bond the transparent substrate 1c being a quartz glass of 0.3 mm thick.

By thus constituting the liquid crystal diffraction lens element 50, even in a case where the refractive indexes of the birefringent Fresnel lens members 3a, 3b and the liquid crystal 4 are different from each other, functions equivalent of those of the liquid crystal diffraction lens element 10 of Example 1 can be realized.

Example 5

An optical head device 100 according to an embodiment of the present invention, is described with reference to FIG. 7. The optical head device 100 according to the Example of the present invention, comprises a light source 101 for emitting a light flux of a predetermined wavelength, a polarizing beam splitter 102 transmitting or reflecting light according to polarization direction of the light, a collimator lens 103 transforming the incident light flux into substantially parallel light, a liquid crystal diffraction lens element 10, a quarter wavelength plate 104, an objective lens 105 for converging light transmitted through the quarter wavelength plate 104 on an optical disk 200, and a photodetector 106 for detecting returning light from the optical disk 200 reflected by the polarizing beam splitter 102.

Here, the objective lens 105 is configured to converge light on a first information recording plane 200a when the incident light "passes through" the liquid crystal diffraction lens element 10. When no voltage is applied (applied voltage is 0 Vrms) to the liquid crystal diffraction lens element 10, the optical head device 100 functions substantially in the same manner as the case of removing the liquid crystal diffraction lens element 10, and incident light is converged on the first information recording plane 200a.

On the other hand, when an effective voltage 10 Vrms is applied to the liquid crystal lens element 10, light incident into the liquid crystal lens element 10 is transformed into divergent light as its focal length is switched by the liquid crystal diffraction lens element 10, and output from the liquid crystal diffraction lens element 10. The light is further transmitted through a quarter wavelength plate 104 and an objective lens 105, and converged on a second information recording plane 200b of an optical disk 200. Returning light from the optical disk 200 is transmitted through the objective lens 105, transformed by the quarter wavelength plate 104 into linearly polarized light whose polarization direction is different by 90° from that of outgoing light incident into the quarter wavelength plate, and the returning light is transmitted through the liquid crystal diffraction lens element 10 as its focal length is switched by the element. The light transmitted through the liquid crystal diffraction lens element 10 is transmitted through a collimator lens 103, reflected by a polarizing beam splitter 102 and incident into a photodetector 106. Then, information recorded into the photodetector 106 is converted to an electrical signal.

As described above, the liquid crystal diffraction lens element according to the embodiment of the present invention can switch alignment direction of the liquid crystal by applying an electric field to the liquid crystal, so that the first birefringent Fresnel lens member and the second birefringent Fresnel lens member function as Fresnel lenses for respective light beams having perpendicular polarization directions, and thus, it is possible to switch focal lengths of both of outgoing light and returning light by a single element.

Further, since polymer liquid crystal is employed as the birefringent material of at least one of the birefringent Fresnel lens members, forming of the birefringent Fresnel lens member is easy, adjustment of refractive indexes is possible and there are many variations of the polymer liquid crystal, and thus, design flexibility is high.

Further, since it is possible to switch whether or not the birefringent Fresnel lens members function as Fresnel lenses by switching on/off an applied voltage, it is possible to simplify control of the applied voltage.

Further, since the shape of the first birefringent Fresnel lens member and the shape of the second birefringent Fresnel lens member are the same, it is possible to change focal length while maintaining the magnification to be the same.

Further, since the extraordinary refractive index directions of the birefringent Fresnel lens members are twisted from each other about an axis in a direction perpendicular to substrate surfaces, it is possible to make the alignment directions of the liquid crystal agree with the extraordinary refractive index directions of the birefringent Fresnel lens members at the concave-convex portions, and thus, it is possible to more suitably exhibit the Fresnel lens function.

Further, the liquid crystal diffraction lens element and the phase plate are integrally formed, adjustment becomes easy and space saving can be realized.

Further, since the alignment direction of the liquid crystal agree with the extraordinary refractive index direction of each of the proximate birefringent Fresnel lens members in the vicinity of the interface between the liquid crystal and the birefringent Fresnel lens member, it is possible to more suitably exhibit the Fresnel lens function.

Further, the optical head device according to the embodiment of the present invention, has at least one of the above effects and can improve light utilization efficiency.

Further, the optical head device is configured so that the polarization direction of outgoing light agrees with or perpendicular to the extraordinary refractive index direction of the first birefringent Fresnel lens member, the first birefringent Fresnel lens member can more suitably exhibit its Fresnel lens function.

INDUSTRIAL APPLICABILITY

The liquid crystal diffraction lens element and the optical head device according to the present invention, are useful as e.g. a liquid crystal diffraction lens element and an optical head device for which capability of switching focal lengths for both of outgoing light and returning light by a single element, is useful.

The entire disclosure of Japanese Patent Application No. 2004-304249 filed on Oct. 19, 2004 including specification, claims, drawings and summary is incorporated herein by reference in its entirety.

What is claimed is:

1. A liquid crystal diffraction lens element comprising:
a pair of transparent substrates disposed in parallel to each other,
a liquid crystal sandwiched between the pair of transparent substrates,
transparent electrodes for applying an electric field to the liquid crystal,
a first birefringent Fresnel lens member formed between a first one of the transparent substrates and the liquid crystal, having a Fresnel lens shape and made of a birefringent material, and
a second birefringent Fresnel lens member formed between a second one of the transparent substrates opposed to the first one of the transparent substrates and the liquid crystal, having a Fresnel lens shape and made of a birefringent material;
wherein each of the first birefringent Fresnel lens member and the second birefringent Fresnel lens member is an annular Fresnel lens formed around an optical axis of the liquid crystal diffraction lens element;
wherein the extraordinary refractive index direction of the first birefringent Fresnel lens member and the extraordinary refractive index direction of the second birefringent Fresnel lens member are perpendicular to each other; and
wherein the alignment direction of the liquid crystal at the interface between the liquid crystal and the first birefringent Fresnel lens member or the transparent electrode, and the alignment direction of the liquid crystal at the interface between the liquid crystal and the second birefringent Fresnel lens member or the transparent electrode, are perpendicular to each other.

2. The liquid crystal diffraction lens element according to claim 1, wherein at least one of the birefringent material of the first birefringent Fresnel lens member and the birefringent material of the second birefringent Fresnel lens member, is a polymer liquid crystal.

3. The liquid crystal diffraction lens element according to claim 1, wherein the liquid crystal and the birefringent Fresnel lens members have the same ordinary refractive index and the same extraordinary refractive index.

4. The liquid crystal diffraction lens element according to claim 1, wherein the shape of the first birefringent Fresnel lens member and the shape of the second birefringent Fresnel lens member are the same.

5. The liquid crystal diffraction lens element according to claim 1, wherein the extraordinary refractive index directions of the first birefringent Fresnel lens member and the second birefringent Fresnel lens member, are parallel with the transparent substrate surfaces and twisted from each other about an axis perpendicular to the transparent substrate surfaces.

6. The liquid crystal diffraction lens element according to claim 1, wherein the liquid crystal diffraction lens element is integrated with a phase plate producing a phase difference of an odd number times of $\pi/2$ of wavelength of transmission light.

7. The liquid crystal diffraction lens element according to claim 1, wherein the alignment direction of the liquid crystal agrees with the extraordinary refractive index direction of each of the birefringent Fresnel lens members in the vicinity of the interface between the liquid crystal and the birefringent Fresnel lens member.

8. The liquid crystal diffraction lens element according to claim 1, wherein a part of each of the birefringent Fresnel lens members is made of an isotropic material.

9. The liquid crystal diffraction lens element according to claim 1, wherein a phase adjustment surface of concave-convex shape is integrated with at least one of the transparent substrates.

10. The liquid crystal diffraction lens element according to claim 9, wherein the phase adjustment surface is made of a plurality of materials having refractive indexes of different temperature coefficients.

11. An optical head device comprising:
a light source,
a light-converging means for converging light emitted from the light source on an optical recording medium,
a liquid crystal diffraction lens element disposed in an optical path between the light source and the light-converging means, the liquid crystal diffraction lens element comprising:
a pair of transparent substrates disposed in parallel to each other,
a liquid crystal sandwiched between the pair of transparent substrates,
transparent electrodes for applying an electric field to the liquid crystal,
a first birefringent Fresnel lens member formed between a first one of the transparent substrates and the liquid crystal, having a Fresnel lens shape and made of a birefringent material, and
a second birefringent Fresnel lens member formed between a second one of the transparent substrates opposed to the first one of the transparent substrates and the liquid crystal, having a Fresnel lens shape and made of a birefringent material;
wherein each of the first birefringent Fresnel lens member and the second birefringent Fresnel lens member is an annular Fresnel lens formed around an optical axis of the liquid crystal diffraction lens element;
wherein the extraordinary refractive index direction of the first birefringent Fresnel lens member and the extraordinary refractive index direction of the second birefringent Fresnel lens member are perpendicular to each other; and wherein the alignment direction of the liquid crystal at the interface between the liquid crystal and the first birefringent Fresnel lens member or the transparent electrode, and the alignment direction of the liquid crystal at the interface between the liquid crystal and the second birefringent Fresnel lens member or the transparent electrode, are perpendicular to each other, and a photodetector for reading out an information from the optical recording medium.

12. The optical head device according to claim 11, wherein the polarization direction of outgoing light incident into the liquid crystal diffraction lens element, from the light source side, agrees with or is perpendicular to the extraordinary refractive index direction of the first birefringent Fresnel lens member disposed on the side of the liquid crystal diffraction lens element where the outgoing light is incident among the birefringent Fresnel lens members of the liquid crystal diffraction lens element.

13. The optical head device of claim 11, wherein at least one of the birefringent material of the first birefringent Fresnel lens member and the birefringent material of the second birefringent Fresnel lens member, is a polymer liquid crystal.

14. The optical head device of claim 11, wherein the liquid crystal and the birefringent Fresnel lens members have the same ordinary refractive index and the same extraordinary refractive index.

15. The optical head device of claim 11, wherein the shape of the first birefringent Fresnel lens member and the shape of the second birefringent Fresnel lens member are the same.

16. The optical head device of claim 11, wherein the extraordinary refractive index directions of the first birefringent Fresnel lens member and the second birefringent Fresnel lens member, are parallel with the transparent substrate surfaces and twisted from each other about an axis perpendicular to the transparent substrate surfaces.

17. The optical head device of claim 11, wherein the liquid crystal diffraction lens element is integrated with a phase plate producing a phase difference of an odd number times of $\pi/2$ of wavelength of transmission light.

18. The optical head device of claim 11, wherein the alignment direction of the liquid crystal agrees with the extraordinary refractive index direction of each of the birefringent Fresnel lens members in the vicinity of the interface between the liquid crystal and the birefringent Fresnel lens member.

19. The optical head device of claim 11, wherein a part of each of the birefringent Fresnel lens members is made of an isotropic material.

20. The optical head device of claim 11, wherein a phase adjustment surface of concave-convex shape is integrated with at least one of the transparent substrates.

* * * * *